United States Patent
Certain

(10) Patent No.: US 8,464,980 B2
(45) Date of Patent: Jun. 18, 2013

(54) POWER PLANT, A HELICOPTER INCLUDING SUCH A POWER PLANT, AND A METHOD IMPLEMENTED BY SAID POWER PLANT

(75) Inventor: Bernard Certain, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 332 days.

(21) Appl. No.: 12/951,206

(22) Filed: Nov. 22, 2010

(65) Prior Publication Data

US 2011/0121127 A1   May 26, 2011

(30) Foreign Application Priority Data

Nov. 26, 2009 (FR) .................................. 09 05678

(51) Int. Cl.
*B64C 27/82* (2006.01)
*B64D 25/00* (2006.01)
*B64D 35/04* (2006.01)
*B64D 35/08* (2006.01)
*B64D 41/00* (2006.01)

(52) U.S. Cl.
USPC .......... 244/58; 244/17.19; 244/17.11; 244/60

(58) Field of Classification Search
USPC .................. 244/58, 60, 17.19, 17.21, 17.13, 244/17.11; 60/698
See application file for complete search history.

(56) References Cited

U.S. PATENT DOCUMENTS

| 3,455,182 A * | 7/1969 | Kelley ............................. 244/58 |
| 6,098,921 A * | 8/2000 | Piasecki ..................... 244/17.19 |
| 2010/0064689 A1* | 3/2010 | Reinhardt ....................... 60/706 |

FOREIGN PATENT DOCUMENTS

| DE | 102007017332 A1 | 10/2008 |
| FR | 2769584 A1 | 4/1999 |
| FR | 2914697 A1 | 10/2008 |
| FR | 2933910 A1 | 1/2010 |

OTHER PUBLICATIONS

Search Report and Written Opinion; Application No. FR 0905678 Dated: Nov. 26, 2009.

* cited by examiner

*Primary Examiner* — Tien Dinh
*Assistant Examiner* — Richard R Green
(74) *Attorney, Agent, or Firm* — Brooks Kushman P.C.

(57) ABSTRACT

The present invention relates to a power plant (10) having a single engine (13) together with both a main gearbox (MGB) suitable for driving the rotary wing (3) of a helicopter (1) and a tail gearbox (TGB) suitable for driving an anti-torque rotor (4) of a helicopter (1). The power plant (10) also includes a first electric motor (11) mechanically connected to said main gearbox (MGB) in order to be capable of driving said main gearbox (MGB), and a second electric motor (12) mechanically connected to said tail gearbox (TGB) in order to be capable of driving said tail gearbox (TGB).

16 Claims, 2 Drawing Sheets

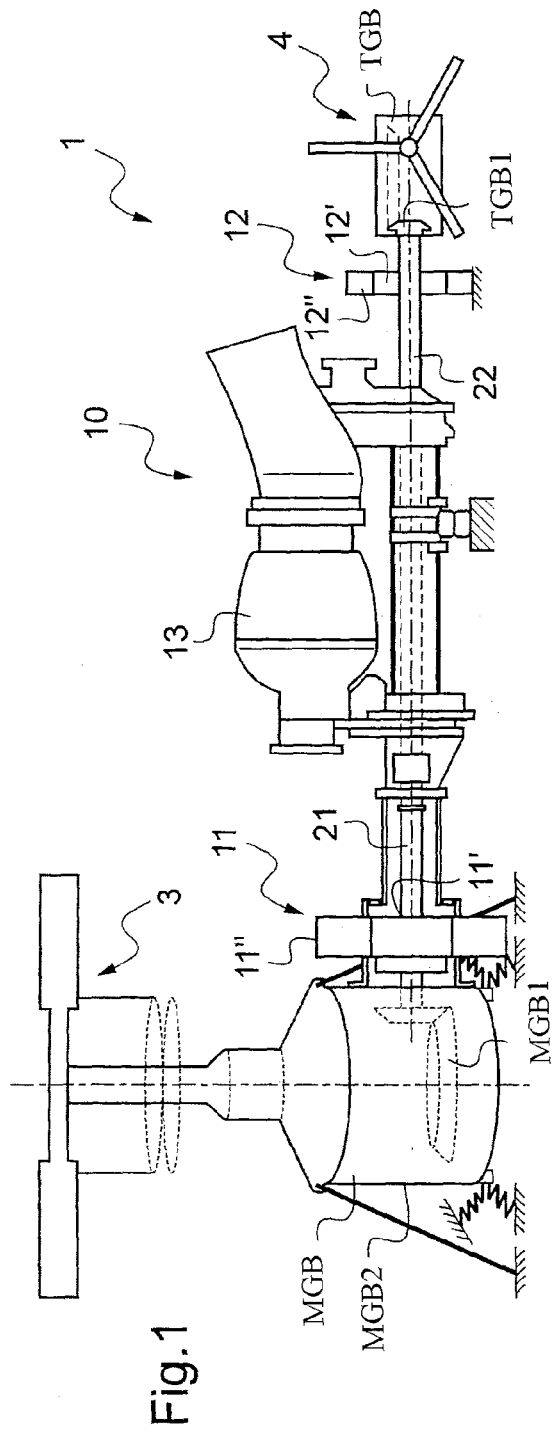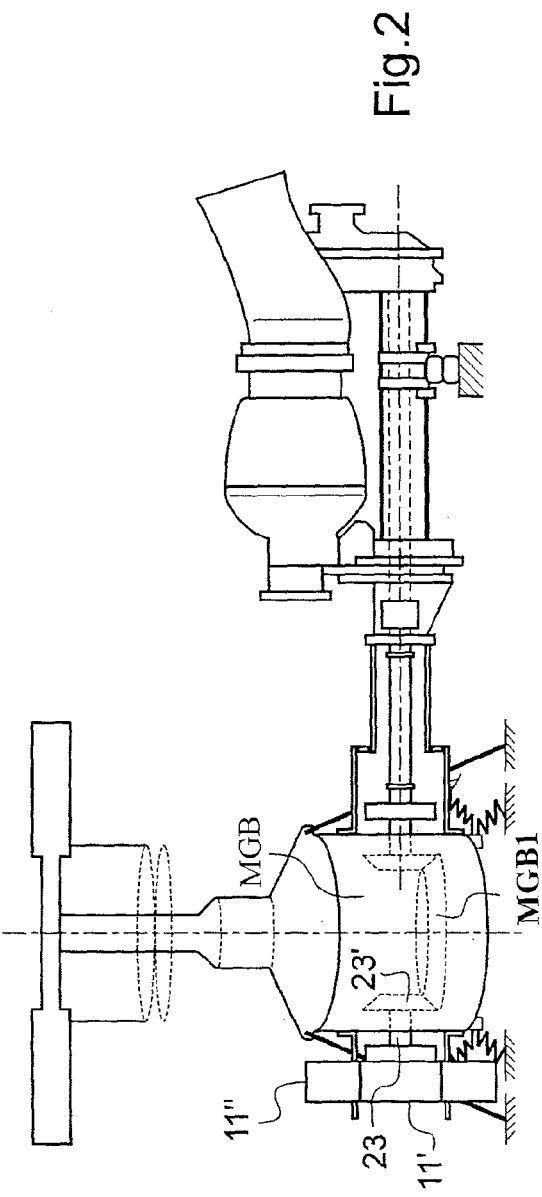

POWER PLANT, A HELICOPTER
INCLUDING SUCH A POWER PLANT, AND A
METHOD IMPLEMENTED BY SAID POWER
PLANT

CROSS REFERENCE TO RELATED
APPLICATION

This application claims the benefit of FR 09 05678, filed Nov. 26, 2009, the disclosure of which is incorporated herein by reference.

FIELD OF THE INVENTION

The present invention relates to a power plant, to a helicopter including such a power plant, and to a method implemented by said power plant. The invention thus lies in the technical field of helicopter power plants.

BACKGROUND OF THE INVENTION

A helicopter is conventionally provided with a rotary wing for providing it with lift and propulsion. Furthermore, a helicopter sometimes includes an anti-torque tail rotor for countering the torque exerted by the rotary wing on the fuselage of the helicopter.

In order to drive the rotary wing, and where appropriate the anti-torque rotor, the helicopter has a power plant.

The power plant implements one or more engines. It should be understood that throughout this specification, the term "engine" applies equally well to turbine engines or to piston engines. The term "engine" is to be contrasted with the term "electric motor", where the term "electric motor" designates a motor driven by electricity, a so-called "brushless" motor for example.

Amongst rotorcraft, there are thus so-called "single-engined" helicopters having a power plant that has only one engine in order to drive the rotary wing, and the anti-torque rotor, if any. Conversely, certain helicopters possess at least two engines for this purpose.

It can be understood that single-engined helicopters present advantages that are not negligible compared with helicopters having a plurality of engines. By way of example, mention can be made of cost that is reasonable, of reduced maintenance operations, and of fuel consumption that is relatively low.

Nevertheless, such single-engined helicopters also present drawbacks.

In the event of failures in the single engine of the power plant of a single-engined helicopter, the power plant presents degraded performance. Under extreme circumstances, the power plant is no longer capable of driving the rotary wing and the anti-torque rotor, which is likely to give rise to a situation that is catastrophic.

Under such conditions, the flight domain and the missions that are authorized for single-engined helicopters are kept small by certification authorities that deliver flight authorizations. In particular, overflying a large city in a single-engined helicopter is not allowed, e.g. overlying the capital of France.

SUMMARY OF THE INVENTION

An object of the present invention is to propose a power plant for a single-engined rotorcraft that enables it to overcome the above-mentioned limitation.

According to the invention, a power plant is provided with a single engine together with a main power transmission gearbox suitable for driving the rotary wing of a helicopter, and a tail power transmission gearbox suitable for driving an anti-torque rotor of a helicopter As mentioned above, the engine may be a turbine engine or a piston engine.

This power plant is remarkable in that it includes a first electric motor mechanically connected to said main gearbox in order to be capable of driving said main gearbox and a second electric motor mechanically connected to said tail gearbox in order to be capable of driving said tail gearbox.

The first electric motor and the second electric motor may be brushless motors, and they are connected respectively to a main gear of the main gearbox and to a tail gear of the tail gearbox.

First electric motor then does not drive the tail gearbox and the second electric motor then does not drive the main gearbox. Thus, contrary to document FR 2 933 910, the invention does not provide a turbine engine and an electric motor driving the same drive means, but rather a first electric motor directly driving only the main gearbox and a second electric motor directly driving only the tail gearbox.

The first electric motor and the second electric motor are capable of operating in a mode of operation known as "motor" mode. A first rotor of the first electric motor then drives the main gearbox and a second rotor of the second electric motor then drives the tail gearbox, with drive then passing via respective first and second mechanical transmission systems, for example.

Furthermore, the first and second electric motors are also capable of operating in a mode of operation known as "generator" mode. In this mode of operation, the main gear and the tail gear drive the first rotor and the second rotor respectively in rotation, with the first and second electric motors then generating electricity. The generation of electricity by the first and second electric motors may be accompanied by the creation of a braking force tending to slow down the main and tail gears, respectively.

Reference may be made to the literature for further information about electric motors operating in these two modes.

Under such conditions, the invention presents numerous advantages.

Firstly, in the event of failures of a turbine engine, the first and second electric motors drive the rotary wing and the anti-torque rotor, thereby enabling a pilot to land safely without having recourse to auto-rotation, a procedure that is always chancy and difficult to implement. Under such circumstances, it should be possible to overfly large built-up areas without danger, even in a single-engined helicopter.

Furthermore, the engine of single-engined helicopter having a conventional power plant is dimensioned so as to be capable of delivering a maximum level of power that is suitable for covering the entire flight range, even though stages that require maximum power represent a tiny portion of the flight range. Such overdimensioning has non-negligible consequences in terms of the financial costs of the engine.

However, with the invention, there is no longer any need to use such an engine. It is entirely possible to use an engine that develops a level of power that is limited compared with the maximum power level that needs to be delivered, with the first and second electric motors then delivering the extra power needed to achieve maximum power when required.

Furthermore, the performance of the first and second electric motors is not dimensioned by temperature, altitude, and external pressure conditions, thereby providing a certain amount of independence relative to external conditions.

Consequently, the power that needs to be taken into consideration when dimensioning the engine can be reduced because of the presence of the first and second electric motors. This leads to a significant saving from a financial point of view, from a fuel consumption point of view, and indeed concerning the weight of the engine.

Finally, as explained below, in generator mode, the first and second electric motors are capable of slowing down the main and tail gearboxes and thus of avoiding incidents.

As a result, the power plant is particularly novel in that it allows large built-up areas to be overflown by a single-engined rotorcraft, while also achieving substantial savings.

The invention may also present one or more of the following additional characteristics.

Thus, the engine is optionally connected to the main gearbox by a first shaft, the tail gearbox being connected via a second shaft to the engine or to the main gearbox. The engine thus drives the tail gearbox directly or indirectly via the main gearbox.

It can be understood that the first shaft may have a single segment or may comprise a plurality of segments, each segment being fastened to at least one adjacent segment. Similarly, the second shaft may comprise a single segment or indeed a plurality of segments.

Furthermore, the second shaft may extend the first shaft.

In addition, the power plant is suitable for being arranged on a helicopter having a rotary wing with a given nominal speed of rotation, the main gearbox has a given first torque limit, the first electric motor has a first maximum electric power equal to a first percentage of a first product of said first nominal speed of rotation multiplied by the first torque limit, with the first percentage lying in the range 20% to 40% of the first product.

It is recalled that a rotary wing of a helicopter rotates at a speed of rotation that is predetermined by the manufacturer. More precisely, the manufacturer accepts a speed of rotation lying between a minimum speed, e.g. equal to 98% of the predetermined speed, and a maximum speed, e.g. equal to 102% of the predetermined speed.

This predetermined speed to be complied with is referred to as the nominal speed of rotation by the person skilled in the art. Under such circumstances, this concept of a nominal speed of rotation is well known to the person skilled in the art.

Thus, the first electric motor is dimensioned as a function of the first maximum power it is to deliver. This first maximum power defined on the basis of the first percentage represents a compromise that is advantageous and inventive insofar as such a first electric motor serves to avoid limiting the performance of the helicopter while not being overdimensioned, and consequently being lighter in weight and less expensive.

The first maximum electric power makes it possible to continue flying at a speed known as the "VY" speed after a failure of the engine, possibly with a small drop in the speed of rotation of the rotary wing. The VY speed corresponds to the optimum descent/climb speed at which the helicopter has the smallest glide angle, i.e. about 55 knots (kt) to 65 kt.

Auto-rotation then becomes pointless, or at least easy to put into operation and to perform.

In a first variant arrangement of the first electric motor, the first electric motor is arranged in series relative to a first mechanical system enabling the main gearbox to be driven by the engine.

The main gearbox is driven by a first shaft and the first electric motor is arranged on the first shaft. For example, the first rotor of the first electric motor is constrained to rotate with the first shaft.

In a second variant arrangement of the first electric motor, the first electric motor is arranged in parallel relative to a first mechanical system enabling the main gearbox to be driven by the engine.

The main gearbox is driven by a first shaft, and the first electric motor is arranged on a main intermediate shaft distinct from the first shaft. For example, the first rotor of the first electric motor is constrained to rotate with the main intermediate shaft, said main intermediate shaft meshing with the main gearbox.

Furthermore, the power plant is suitable for being arranged on a helicopter provided with a rotary wing having a given nominal speed of rotation, the main gearbox has a given first torque limit, the second electric motor has a second maximum electric power equal to a second percentage of a first product of the nominal speed of rotation multiplied by the first torque limit and the second percentage lies in the range 5% to 10% of the first product.

Thus, the second electric motor is dimensioned as a function of the second maximum power it is to deliver. This second power defined in terms of a second percentage represents a compromise that is advantageous and inventive insofar as such a second electric motor enables the rotorcraft to hover without being overdimensioned. Under such circumstances, the second electric motor is neither heavy nor expensive.

In a first variant arrangement for the second electric motor, the second electric motor is arranged in series relative to a second mechanical system enabling the tail gearbox to be driven by the engine.

The tail gearbox is driven by a second shaft, and the second electric motor is arranged on the second shaft. For example, the second rotor of the second electric motor is constrained to rotate with the second shaft.

In a second variant arrangement of the second electric motor, the second electric motor is arranged in parallel relative to a second mechanical system enabling the tail gearbox to be driven by the engine.

The tail gearbox is driven by a second shaft, and the second electric motor is arranged on a tail intermediate shaft distinct from the second shaft. For example, the second rotor of the second electric motor is constrained to rotate with the tail intermediate shaft, said tail intermediate shaft meshing with the tail gearbox.

Furthermore, the power plant may include a regulator member provided with a regulator processor controlling the first electric motor and the second electric motor, the regulator member being electrically connected:

to the first electric motor and to the second electric motor; and to at least one main battery dedicated to electrically powering the first electric motor and the second electric motor.

The regulator processor of the regulator member may include a memory, or use may be made of an external memory containing the regulation relationship.

The regulator processor causes the first and second electric motors to operate in generator mode or in motor mode and it controls the first and second electric motors in application of predetermined relationships that are stored in its regulation memory.

Furthermore, said regulator member is optionally electrically connected to at least one secondary battery suitable for powering the electrical power network of a helicopter.

In generator mode, the first and second electric motors can charge the main and second batteries electrically, and they can therefore replace the alternators that are conventionally provided on a helicopter.

Furthermore, in the event of a failure of the secondary battery, the regulator member may optionally cause the main battery to power the electrical power network of the helicopter.

In addition, the first and second electric motors are suitable for operating in motor mode or in electricity generator mode, and the power plant includes display means that display for the first electric motor and the second electric motor:

an indication as to whether it is operating in motor mode or in generator mode, at least one regulator member indicating the mode of operation to a display processor of the display means; and a level of remaining charge in at least one main battery of the first and second electric motors, first measurement means of conventional type measuring the remaining charge level and sending the remaining charge level to a display processor.

In addition, the display means may present at least one of the following items of information.

Firstly, the display means may present a remaining operating time for at least one of the first and second electric motors, at least second measurement means measuring the remaining operating time and transmitting the remaining operating time to a display processor of said display means. Said second measurement means may comprise the regulator means and the first measurement means for measuring the remaining charge level. The regulator means determine the electricity consumption of the electric motor in question and then divide the remaining charge level by said consumption in order to deduce the remaining operating time.

Secondly, the display means may present a temperature of a main battery that is electrically connected to the first electric motor and/or second electric motor, having at least third measurement means of conventional type measuring the temperature, and transmitting said temperature to a display processor of said display means.

It can be understood that the display processor may make use of an internal memory or of an external memory in order to perform its function.

Furthermore, the power plant optionally includes warning means provided with a warning processor generating a warning when at least one of the following situations occurs:

with at least first measurement means measuring the remaining charge level of at least one main battery of each electric motor, the warning means trigger a warning when the measured remaining charge level drops below a predetermined threshold charge level;

with at least second measurement means measuring a remaining operating time for at least the first and second electric motors, the warning means trigger a warning when the measured operating time drops below a predetermined threshold time; and with at least third measurement means measuring a temperature of a main battery electrically connected to the first electric motor and to the second electric motor, the warning means trigger a warning when the measured temperature exceeds a predetermined threshold temperature.

It is thus possible to envisage measuring the current (amperage) leaving each main battery and to deliver a warning when the current is zero.

It can be understood that the warning processor may make use of an internal memory or of an external memory in order to perform its function.

Furthermore, when the power plant includes at least two processors selected from the regulator processors, the display processor and the warning processor, these processors may form parts of a single processor that performs the various functions.

Finally, the first and second electric motors are connected to at least one main electric battery, and the power plant advantageously includes means for taking the main battery out of circuit in order to avoid any incident on the ground.

In addition to providing a power plant, the invention also provides a helicopter provided both with a rotary wing and with an anti-torque rotor, and also with a power plant, the power plant being provided with a single engine and a main gearbox driving the rotary wing and a tail gearbox driving the anti-torque rotor.

The power plant is then as described above and in particular comprises a first electric motor mechanically connected to the main gearbox so as to be capable of driving the main gearbox, and a second electric motor mechanically connected to the tail gearbox so as to be capable of the driving the tail gearbox.

Similarly, the invention also provides a method of driving a rotary wing and an anti-torque rotor of a helicopter, the helicopter having a power plant provided with a single engine and with a main gearbox driving the rotary wing and with a tail gearbox driving the anti-torque rotor, the power plant including a first electric motor mechanically connected to the main gearbox so as to be capable of driving the main gearbox, and a second electric motor mechanically connected to the tail gearbox so as to be capable of driving the tail gearbox.

Thus, in this method, at least one of the following actions is performed, possibly using a regulator member of the power plant.

For an engine that is dimensioned to deliver power lying within a given range, in a normal mode of operation during which the engine is capable of delivering said power for which it is dimensioned, the main gearbox and the tail gearbox are driven using the sole engine. Since no failure is present, the engine performs its function in full.

In a first emergency mode, in the event of engine overspeed, i.e. when a moving member of the engine exceeds a given maximum speed, the first electric motor is caused to operate in electricity generator mode and the second electric motor is caused to operate in electricity generator mode to slow down the engine during a first predetermined duration, and then if the engine is still in overspeed at the end of the first duration, the engine is stopped and the first electric motor is caused to operate in electric motor mode in order to drive the main gearbox, and the second electric motor is caused to operate in electric motor mode in order to drive the tail gearbox.

For example, a failure in the regulation of a turbine engine or indeed a leak of oil from the bearing of the turbocharger of a piston engine may lead to engine overspeed, where such overspeed is rare but extremely dangerous.

Once the overspeed has been detected, e.g. by means of sensors indicating the speed of rotation of the rotary wing and of the tail rotor or the speed of movement of a moving member the engine, such as a compressor or the turbine of a turbine engine or a piston or of a piston engine, a regulator member of the power plant causes the first and second electric motors to operate in generator mode. This creates a force tending to brake the movement of the first and second shafts, and consequently of the engine.

The current generated may then be used to charge the various batteries of the helicopter or it may be dissipated in a resistance element, for example.

If at the end of a first duration, e.g. of about 10 seconds, the engine is still in overspeed, the helicopter pilot is informed of the overspeed. The engine is then stopped. The speeds of rotation of the rotary wing and of the anti-torque rotor then decrease correspondingly.

As from a threshold speed of rotation of the rotary wing and a threshold speed of rotation of the anti-torque rotor, the regulator member then causes the first and second electric motors to operate in motor mode in order to drive the main gearbox and the tail gearbox, respectively.

In a second emergency mode, the engine is no longer capable of driving the main gearbox at a given first speed, and the first electric motor is caused to operate in electric motor mode in order at least to contribute to driving the main gearbox.

A conventional sensor can measure the speed of rotation of a member of the main gearbox, for example, and send that information to a regulator member. The regulator member activates the second emergency mode when the speed of rotation of said member of the main gearbox drops below a predetermined first speed.

This situation may arise when the first drive shaft of the main gearbox has broken.

In a third emergency mode, the engine is no longer capable of driving said tail gearbox at a given second speed, and said second electric motor is caused to operate in electric motor mode in order at least to contribute to driving said tail gearbox.

A conventional sensor can then measure the speed of rotation of a member of the tail gearbox, for example, and send that information to the regulator member. The regulator member activates the third emergency mode when the speed of rotation of said member of the tail gearbox drops below a predetermined second speed.

This situation may occur when the second drive shaft for the tail gearbox has broken.

In a fourth emergency mode, the engine is no longer capable of driving the main gearbox at a given first speed and is no longer capable of driving said tail gearbox at a given second speed, and the first electric motor is caused to operate in electric motor mode in order at least to contribute to driving the main gearbox, and the second electric motor is caused to operate in electric motor mode in order at least to contribute to driving said tail gearbox.

When the engine is no longer functioning, the first and second electric motors alone contribute to driving the gearboxes. In contrast, when the engine is idling as a result of a leak from a pipe or is operating at less than its nominal speed as a result of a failure or an impact, the first and second electric motors contribute to driving the gearboxes jointly with the engine.

BRIEF DESCRIPTION OF THE DRAWINGS

The invention and its advantages appear in greater detail from the following description of embodiments given by way of illustration and with reference to the accompanying figures, in which:

FIG. 1 is a diagram showing a power plant presenting a first variant arrangement of the first electric motor and a first variant arrangement of the second electric motor;

FIG. 2 is a diagram showing a second variant arrangement of the first electric motor;

DETAILED DESCRIPTION OF THE PREFERRED EMBODIMENT

Figure 3:
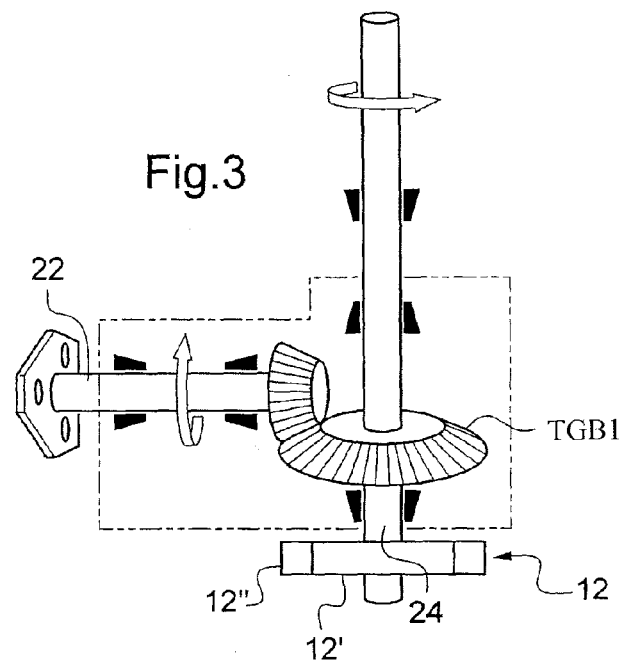
FIG. 3 is a diagram showing a second variant arrangement of the second electric motor.

Elements that are present in more than one of the figures are given the same references in each of them.

FIG. 1 shows a helicopter 1 having a rotary wing 3 comprising a main lift and propulsion rotor. Furthermore, the helicopter 1 possesses an anti-torque rotor 4 arranged at the tail of the helicopter airframe.

In order to drive this rotary wing 3 and tail rotor 4, the helicopter 1 is fitted with a power plant 10 having a single engine 13 and a main gearbox MGB driving the rotary wing 3 and a tail gearbox TGB driving the anti-torque rotor 4. The engine 13 then drives the main gearbox MGB directly and drives the tail gearbox TGB either directly or indirectly depending on the embodiment.

More precisely, the engine 13 drives a first shaft 21 that drives a main gear MGB1 of the main gearbox MGB.

In addition, in the embodiment of FIG. 1, the engine 13 drives a second shaft 22 that drives a tail gear TGB1 of the tail gearbox TGB, the first shaft 21 and the second shaft 22 being in line with each other. In contrast, in the embodiment of FIG. 4, the engine 13 drives the main gearbox MGB, which meshes with the second shaft 22, the second shaft 22 driving the tail gearbox TGB.

Thus, independently of the embodiment, the main gearbox MGB is driven by the engine 13 lastly via the first shaft 21, while the tail gearbox TGB is driven lastly by the second shaft 22.

Furthermore, with reference to FIG. 1, the power plant also includes a first electric motor 11 suitable for driving the main gear MGB1 of the main gearbox MGB, and a second electric motor 12 suitable for driving the tail gear TGB1 of the tail gearbox TGB.

Each electric motor 11, 12 is capable of operating either in so-called "motor" mode in which the stator of the electric motor causes the rotor of the electric motor to rotate in order to drive the associated shaft, or else in a so-called "generator" mode in which the rotor of the electric motor is set into rotation by the associated shaft in order to generate electricity.

In a first variant of the arrangement of the first electric motor 11, the first electric motor 11 is arranged on the first shaft 21. The first electric motor 11 has a first stator 11" and a first rotor 11', with the first rotor 11' being constrained to rotate with the first shaft 21. It should be observed that the first stator 11" may for example be fastened to a casing MGB2 of the main gearbox MGB.

Similarly, in a first variant of the arrangement of the second electric motor 12, the second electric motor 12 is arranged on the second shaft 22. The second electric motor 12 has a second stator 12" and a second rotor 12', with the second rotor 12' being constrained to rotate with the second shaft 22.

In a second variant of the arrangement of the first electric motor 11 shown in FIG. 2, the first electric motor 11 is arranged on a main intermediate shaft 23 suitable for driving the main gear MGB1 of the main gearbox MGB via a bevel gear 23', for example. Thus, the first rotor 11' is constrained to rotate with the main intermediate shaft 23.

Similarly, in a second variant of the arrangement of the second electric motor 12 shown in FIG. 3, the second electric motor 12 is arranged on a tail intermediate shaft 24 suitable for driving the tail gear TGB1 of the tail gearbox TGB. Thus, the second rotor 12' is constrained to rotate with the tail intermediate shaft 24, the tail intermediate shaft 24 being secured to a bevel gear of the tail gearbox TGB, for example.

Furthermore, the rotary wing 3 has a given nominal speed of rotation Nr1, the main gearbox MGB has a given first torque limit Trq1, the first electric motor 11 develops a maximum first electric power PMAX1 equal to a first percentage PRCT1 of the first product Q1 of said nominal speed of rotation Nr1 multiplied by said first torque limit Trq1, said first percentage lying in the range 20% to 40% of said first product Q1, i.e.:

$$PMAX1 = PRCT1 * Q1$$

where Q1=Nr1*Trq1, and where "*" represents the multiplication sign.

Similarly, said second electric motor 12 has a maximum second electric power PMAX2 equal to a second percentage PRCT2 of the first product Q1 of said nominal speed of rotation Nr1 of the rotary wing 3 multiplied by said first torque limit Trq1, said second percentage PRCT1 lying in the range 5% to 10% of said first product Q1, i.e.:

$$PMAX2 = PRCT2 * Q1$$

where Q1=Nr1*Trq1, and where "*" represents the multiplication sign.

Figure 4:
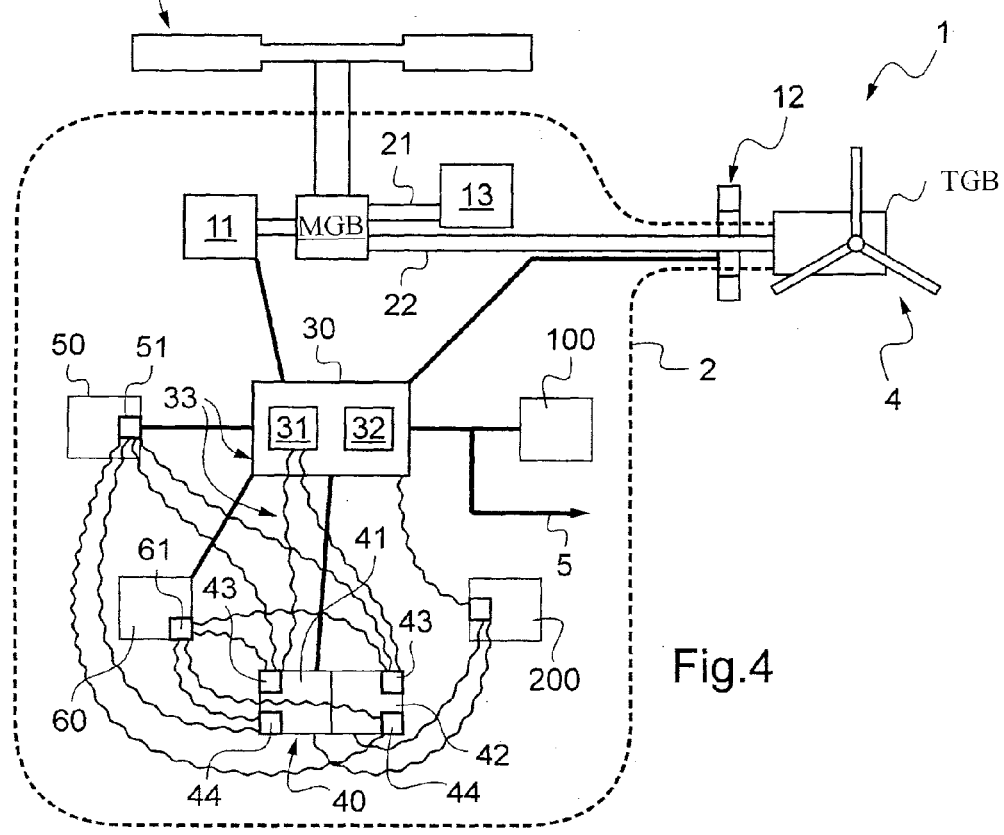
FIG. 4 is a diagram showing a helicopter of the invention.

With reference to FIG. 4, inside the airframe 2 of the helicopter 1, the power plant 10 may include a regulator member 30 provided with a regulator processor 31 to control the first electric motor 11 and the second electric motor 12 using programmed relationships contained in a regulator memory 32 of the regulator member 30. Under such circumstances, the regulator member 30 is electrically connected to the first electric motor 11, to the second electric motor 12, and to a set 40 of main batteries including at least one main battery for electrically powering the first electric motor 11 and the second electric motor 12, e.g. a main battery set 40 having two main batteries 41 and 42. Furthermore, the regulator member 30 shown is electrically connected to at least one secondary battery 100 powering the electrical power network 5 of the helicopter 1.

The power plant 10 also includes display means 50 providing an indication as to whether each of the first electric motor 11 and the second electric motor 12 is operating in motor mode or in generator mode. The regulator member 30 informs a display processor 51 of the display means 50 whether it is causing the first and second electric motors to operate in motor mode or in generator mode.

For example, the display means provides a digital display of the length of time the motor has been operating in motor mode or generator mode, with the location or the color of the digital display depending on the mode of operation.

Advantageously, conventional first measurement means 43 measure the level of charge remaining in a main battery and transmit this level of remaining charge to the display processor 51, with the display processor 51 displaying the remaining level of charge on a screen so that it can be seen by the pilot of the helicopter 1.

In addition, the display means 50 presents a remaining length of operating time for at least one of the first and second electric motors 11 and 12, with at least second measurement means 33 measuring the remaining operating time and delivering said operating time to the display processor 51. To simplify the power plant, the second measurement means 33 comprise the first measurement means 33 and the regulator member 31, the regulator member 31 deducing the remaining operating time in real time as a function firstly of the level of charge in the set 40 of main batteries 41 and 42, and secondly the consumption of electricity by the first and second electric motors 11, 12.

Finally, third measurement means 44 for each main battery 41 and 42 measure the temperature of the set 40 of main batteries 41 and 42 and deliver the temperature to the display processor 51 for display on a display screen.

To assist the pilot, the power plant optionally includes warning means 60 having a warning processor 61 that generates an audible or visible warning when the remaining level of charge drops below a predetermined threshold charge, the remaining operating time drops below a predetermined threshold time, or when the temperature of the main batteries exceeds a predetermined threshold temperature.

It should be observed that it is possible to envisage an intermediate warning, informing the pilot that the temperature is likely to exceed said threshold temperature. Thus, if the temperature of the main batteries exceeds an intermediate temperature, below the threshold temperature, an intermediate warning is triggered.

To activate or stop the electric motors, the pilot uses means 200 for taking the set 40 of main batteries out of circuit, including both of the main batteries 41 and 42 shown in FIG. 4.

So long as the engine is operating normally, i.e. developing the power required in the specifications, in a normal mode of operation, the main and tail gearboxes MGB and TGB are driven solely by the engine 13.

In contrast, if the moving members of the engine move at speeds that are proscribed by the manufacturer, the engine is in overspeed. Sensors specific for this purpose deliver overspeed information to the regulator member 30, e.g. by measuring the speed of rotation of said members or measuring the speed of rotation of the rotary wing that is, in fact, proportional to the speed of rotation of said members. Under such circumstances, the regulator member 30 triggers a first emergency mode and causes the first and second electric motors 11 and 12 to operate in generator mode in an attempt to slow down the engine.

At the end of a given first duration, if the engine is still in overspeed, the regulator member 30 or some other element of the helicopter transmits information concerning overspeed to the pilot. The pilot then stops the engine, e.g. using a fuel cut-out suitable for stopping fuel being supplied to the engine.

This gives rise to a drop in the speed of rotation of the rotary wing 3 below a given first speed and to a drop in the speed of rotation of the anti-torque rotor 4 below a given second speed. The regulator member receives information relating to said speed of rotation of the rotary wing 3 via a conventional sensor, which speed is proportional to the speed of rotation of the anti-torque rotor 4. Under such circumstances, when the speed of rotation of the rotary wing 3 drops below the given first speed and when the speed of rotation of the anti-torque rotor 4 drops below the given second speed, the regulator member 30 causes the first and second electric motors 11 and 12 to operate in motor mode in order to drive the rotary wing 3 and the anti-torque rotor 4 via the main gearbox MGB and the tail gearbox TGB.

It should be observed that when not in the first emergency mode, the regulator member 30 orders:

only the first electric motor 11 to operate in motor mode in a second emergency mode in order to drive the rotary wing 3 if the speed of rotation of the rotary wing 3 drops below said given first speed;

only the second electric motor 12 to operate in motor mode in a third emergency mode to drive the anti-torque rotor 4 if the speed of rotation of the anti-torque 4 drops below said given second speed;

both the first electric motor 11 and the second electric motor 12 to operate in motor mode in a fourth emergency mode to drive the rotary wing 3 and the anti-torque rotor 4, when the speed of rotation of the rotary wing 3 and the speed of rotation of the anti-torque rotor 4 drop respectively below said given first speed and said given second speed.

It should be observed that the first and second electric motors and the set of main batteries together with the associated regulator member are advantageously independent of the conventional equipment of a helicopter, i.e. specifically the engine and the electrical power network of the helicopter. Under such circumstances, the invention constitutes emergency means that are effective in the event of the conventional equipment of the helicopter malfunctioning or breaking down. Thus, the invention serves to give a single-engined helicopter a level of safety that is at least as good as the level of safety achieved by a twin-engined helicopter.

Naturally, the present invention may be subjected to numerous variations as to its implementation. Although several embodiments are described, it can readily be understood that it is not conceivable to identify exhaustively all possible embodiments. It is naturally possible to envisage replacing any of the means described by equivalent means without going beyond the ambit of the present invention.

What is claimed is:

1. A power plant having a single engine together with a main gearbox (MGB) suitable for driving the rotary wing of a helicopter, and a tail gearbox (TGB) suitable for driving an anti-torque rotor of a helicopter, wherein the power plant includes a first electric motor mechanically connected to said main gearbox (MGB) in order to be capable of driving said main gearbox (MGB) and a second electric motor mechanically connected to said tail gearbox (TGB) in order to be capable of driving said tail gearbox (TGB).

2. A power plant according to claim 1, wherein said engine is connected to said main gearbox (MGB) by a first shaft, said tail gearbox (TGB) being connected via a second shaft to said engine or to said main gearbox (MGB).

3. A power plant according to claim 1, wherein said power plant is suitable for being arranged on a helicopter having a rotary wing with a given nominal speed of rotation, said main gearbox (MGB) has a given first torque limit, said first electric motor has a first maximum electric power equal to a first percentage of a first product of said nominal speed of rotation multiplied by said first torque limit, with said first percentage lying in the range 20% to 40% of said first product.

4. A power plant according to claim 1, wherein said main gearbox (MGB) is driven by a first shaft (21) and said first electric motor is arranged on said first shaft.

5. A power plant according to claim 1, wherein said main gearbox (MGB) is driven by a first shaft, and said first electric motor is arranged on a main intermediate shaft distinct from said first shaft.

6. A power plant according to claim 1, wherein said power plant is suitable for being arranged on a helicopter provided with a rotary wing having a given nominal speed of rotation, said main gearbox (MGB) has a given first torque limit, said second electric motor has a second maximum electric power equal to a second percentage of a first product of said nominal speed of rotation multiplied by said first torque limit and said second percentage lies in the range 5% to 10% of said first product.

7. A power plant according to claim 1, wherein said tail gearbox (TGB) is driven by a second shaft, and said second electric motor is arranged on said second shaft.

8. A power plant according to claim 1, wherein said tail gearbox (TGB) is driven by a second shaft, and said second electric motor is arranged on a tail intermediate shaft distinct from said second shaft.

9. A power plant according to claim 1, including a regulator member provided with a regulator processor controlling the first electric motor and the second electric motor, said regulator member being electrically connected:
to the first electric motor and to the second electric motor; and
to at least one main battery dedicated to electrically powering the first electric motor and the second electric motor.

10. A power plant according to claim 9, wherein said regulator member is electrically connected to at least one secondary battery suitable for powering the electrical power network (5) of a helicopter.

11. A power plant according to claim 1, wherein said first and second electric motors are suitable for operating in motor mode or in electricity generator mode, and said power plant includes display means that display for said first electric motor and said second electric motor:
an indication as to whether it is operating in motor mode or in generator mode, at least one regulator member indicating the mode of operation to a display processor of said display means; and
a level of remaining charge in at least one main battery of the first and second electric motors, first measurement means measuring the remaining charge level and transmitting said remaining charge level to a display processor of said display means.

12. A power plant according to claim 11, wherein said display means presents at least the following information:
a remaining operating time for at least one of said first and second electric motors, at least second measurement means measuring said remaining operating time and transmitting said remaining operating time to a display processor of said display means; and
a temperature of a main battery electrically connected to the first electric motor and to the second electric motor, at least third measurement means measuring said temperature and transmitting said temperature to a display processor of said display means.

13. A power plant according to claim 1, including warning means provided with a warning processor generating a warning when at least one of the following situations occurs:
with at least first measurement means measuring the remaining charge level of at least one main battery of each electric motor, the warning means trigger a warning when the remaining charge level drops below a predetermined threshold charge level;
with at least second measurement means measuring a remaining operating time for at least said first and second electric motors, the warning means trigger a warning when said operating time drops below a predetermined threshold time; and
with at least third measurement means measuring a temperature of a main battery electrically connected to the first electric motor and to the second electric motor, the warning means trigger a warning when said temperature exceeds a predetermined threshold temperature.

14. A power plant according to claim 1, wherein said first and second electric motors are connected to at least one main electric battery, and said power plant includes means for taking said main battery out of circuit.

15. A helicopter provided both with a rotary wing and with an anti-torque rotor, and also with a power plant, said power plant being provided with a single engine and a main gearbox (MGB) driving said rotary wing and a tail gearbox (TGB) driving said anti-torque rotor, wherein said power plant is according to claim 1, including a first electric motor mechanically connected to said main gearbox (MGB) so as to be capable of driving said main gearbox (MGB), and a second electric motor mechanically connected to said tail gearbox (TGB) so as to be capable of said driving said tail gearbox (TGB).

16. A method of driving a rotary wing and an anti-torque rotor of a helicopter, said helicopter having a power plant provided with a single engine and with a main gearbox (MGB) driving said rotary wing and with a tail gearbox (TGB) driving said anti-torque rotor, said power plant including a first electric motor mechanically connected to said main gearbox (MGB) so as to be capable of driving said main gearbox (MGB), and a second electric motor mechanically connected to said tail gearbox (TGB) so as to be capable of driving said tail gearbox (TGB), in which method at least one of the following actions is performed:

in a normal mode of operation, the main gearbox (MGB) and the tail gearbox (TGB) are driven using the sole engine;

in a first emergency mode, in the event of overspeed of the engine, the first electric motor is caused to operate in electricity generator mode and the second electric motor is caused to operate in electricity generator mode to slow down said engine during a first predetermined duration, and then if the engine is still in overspeed at the end of said first duration, the engine is stopped and the first electric motor is caused to operate in electric motor mode in order to drive said main gearbox (MGB), and said second electric motor is caused to operate in electric motor mode in order to drive said tail gearbox (TGB);

in a second emergency mode, said engine is no longer capable of driving said main gearbox (MGB) at a given first speed, and the first electric motor is caused to operate in electric motor mode in order at least to contribute to driving said main gearbox (MGB);

in a third emergency mode, said engine is no longer capable of driving said tail gearbox (TGB) at a given second speed, and said second electric motor is caused to operate in electric motor mode in order at least to contribute to driving said tail gearbox (TGB); and in a fourth emergency mode, said engine is no longer capable of driving said main gearbox (MGB) at a given first speed and is no longer capable of driving said tail gearbox (TGB) at a given second speed, and the first electric motor is caused to operate in electric motor mode in order at least to contribute to driving the main gearbox (MGB), and the second electric motor is caused to operate in electric motor mode in order at least to contribute to driving said tail gearbox (TGB).

* * * * *